Dec. 29, 1970    T. SALZ    3,550,299
DISPLAY MOUNT FOR PICTURES AND OTHER ARTICLES
Filed Aug. 5, 1968    2 Sheets-Sheet 1

Theodore Salz
INVENTOR.

BY
Karl F. Ross
Attorney

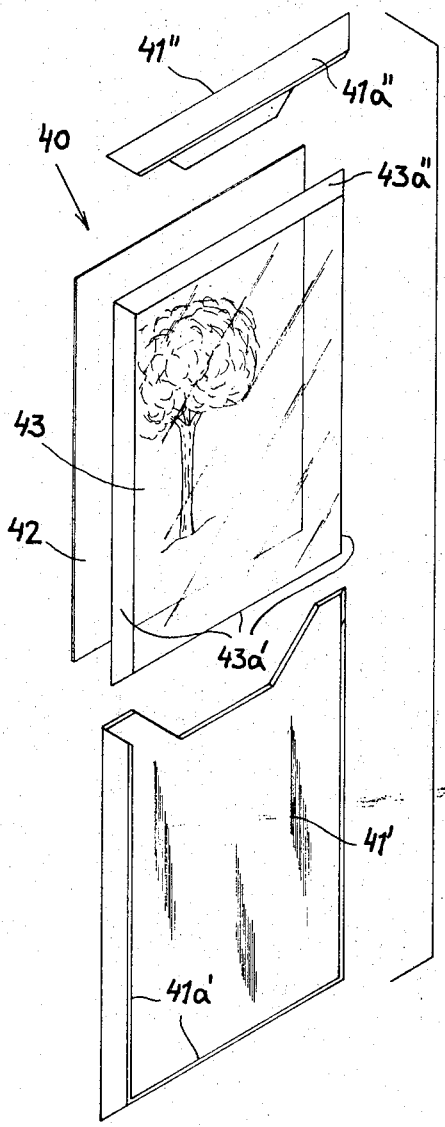
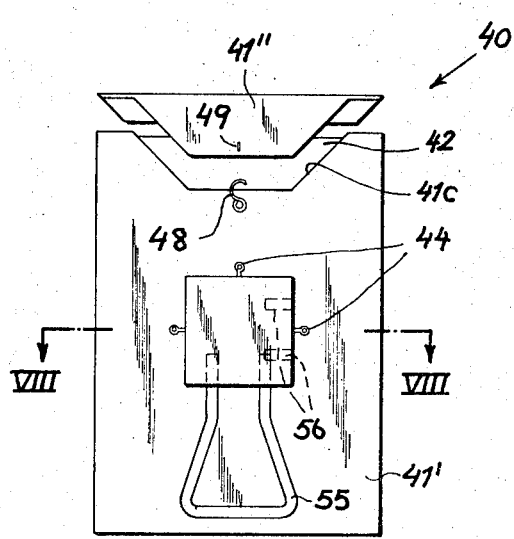
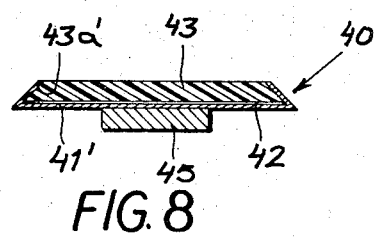
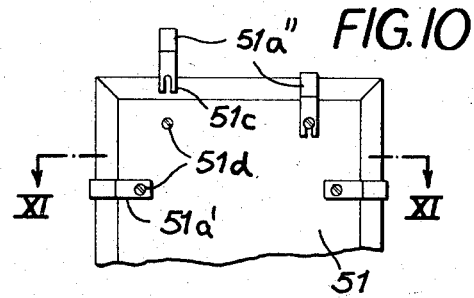
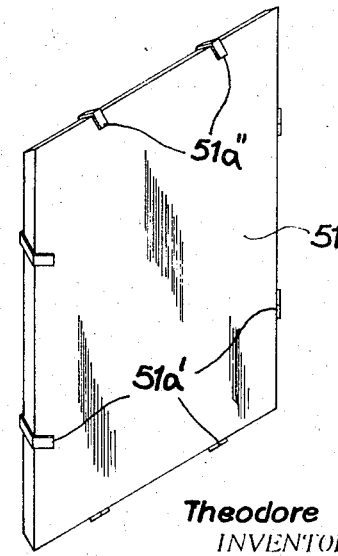
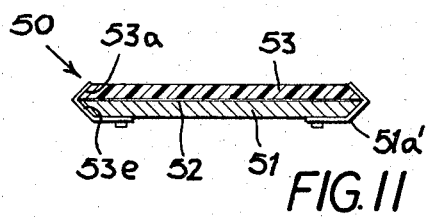

United States Patent Office 3,550,299
Patented Dec. 29, 1970

3,550,299
DISPLAY MOUNT FOR PICTURES
AND OTHER ARTICLES
Theodore Salz, 247 Parkview Ave.,
Bronxville, N.Y. 10461
Filed Aug. 5, 1968, Ser. No. 750,719
Int. Cl. G09f 1/12
U.S. Cl. 40—156                                    12 Claims

ABSTRACT OF THE DISCLOSURE

A backing panel and a transparent front panel are juxtaposed on opposite sides of an object to be displayed. One panel has beveled edges overlain by bent over peripheral formations of the other panel so that the major panel surfaces remain unobstructed.

My present invention relates to a display mount for pictures, charts and other objects to be exhibited, comprising a usually opaque first or backing panel and a transparent second or front panel between which the object is sandwiched.

There are many ways in which the two aforedescribed panels may be detachably interconnected to lock around the object to be displayed. Some of these arrangements involve the use of hooks or the like reaching around the periphery of the transparent front panel, thereby partly obstructing the object on display; such hooks, furthermore, have a tendency to scratch the exposed front surface of the transparent panel, particularly where the latter consists of a plastic material (e.g. a polyacrylate) rather than glass.

My present invention, therefore, aims at providing improved means for removably interconnecting two such panels, one of them transparent, for the above-described display purposes but with avoidance of unsightly encroachments and without any marring of the exposed surface.

Another object of my invention is to provide a simple, compact and inexpensive display mount which can be easily assembled and disassembled to form a protective envelope around either flat or three-dimensional articles to be exhibited to view while also permitting rapid removal and replacement thereof.

In accordance with my present invention, I provide a display mount of the general character set forth wherein one of the two panels is formed with at least one pair of beveled edges facing away from the other panel, the latter having peripheral formations which overhang the periphery of the first-mentioned panel and engage the beveled edges thereof without having materially protruding beyond these edges.

With the usual square or otherwise rectangular panels, a single pair of beveled edges on opposite sides of one panel allows same to be slid in and out between the peripheral formations of the adjoining panel; if the frictional fit between these formations and the beveled panel edges is insufficient to prevent relative displacement, additional means would have to be provided to hold the two panels properly juxtaposed. I prefer, however, to bevel all four edges of the first-mentioned panel and, pursuant to one aspect of my invention, to make the corresponding formations of the other panel at least partly removable to facilitate assembly and disassembly. For this purpose, the panel carrying these peripheral formations may be split into two complementary sections, the formation or formations of one section engaging one side of the beveled panel, or the formations may be hook-shaped elements which are removably mounted at least along one side of the supporting panel. Another solution according to my invention, applicable particularly where the transparent front panel consists of pliable sheet material, resides in designing the peripheral formations as integral extensions of the body of this sheet and flexing them around the beveled backing panel. Supplemental restraining means may be used, if necessary, to hold these sheet extensions in contact with the back panel.

Depending on whether the two panels lie flat against each other or are separated at the center, my novel display mount may be used to accommodate either flat objects or three-dimensional articles. In fact, dished or form-fitting transparent panels of different depth or shape could be interchangeably fitted onto a common back panel to form packages for articles of varying height.

The invention will be described in greater detail with reference to the accompanying drawing in which:

FIG. 6 is an exploded perspective view of another picture frame embodying my invention;

FIG. 7 is a rear view of the picture frame of FIG. 7 in a partly assembled state;

FIG. 8 is a cross-sectional view taken on the line VIII—VIII of FIG. 7;

FIG. 9 is a perspective view of a back panel adapted to be used in a frame generally similar to that of FIGS. 6–8;

FIG. 10 is a partial rear view of a frame incorporating the panel of FIG. 9; and FIG. 11 is a cross-sectional view taken on the line XI—XI of FIG. 10.

Figure 1:
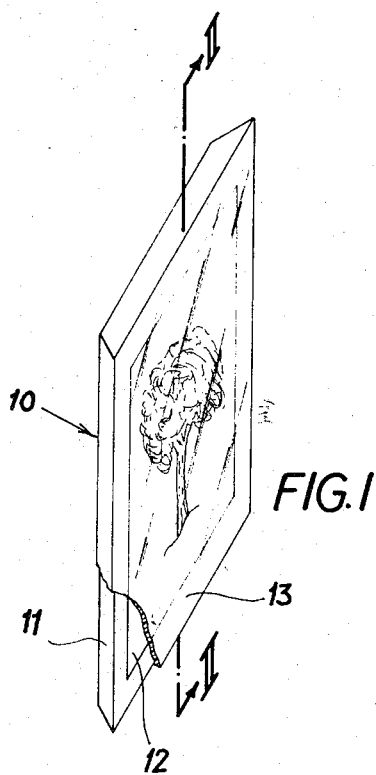
FIG. 1 is a perspective view of a picture frame embodying the features of my invention.
Figure 2:
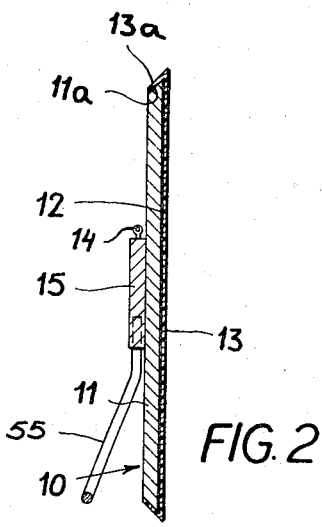
FIG. 2 is a cross-sectional view taken on the line II—II of FIG. 1.

Reference will first be made to FIGS. 1 and 2 which show a picture frame 10 constructed in accordance with my present improvement.

The frame 10 comprises a backing board or supporting panel 11 of metal, plastic, wood or other rigid material whose rectangular outline is defined by rearwardly converging beveled edges 11a. A transparent front panel 13 of the same rectangular outline, consisting of a preferably thermoplastic sheet material (e.g. cellulose acetate), has integral marginal flaps 13a which reach around the periphery of board 11 and overlie the beveled edges 11a thereof. A sheet 12, carrying a picture to be displayed, is sandwiched between the panels 11 and 13 so as to be visible through the latter.

The flaps 13a of flexible and elastic sheet material may be readily bent up to enable insertion of the back board 11 or removal thereof, along with sheet 12; in fact, only one of these flaps needs to be bent up as the board is slid into the U-shaped channel formed by the other three flaps or is extracted from that channel.

One or more eyes 14 are attached to the rear face of of frame to enable its hanging from a hook on a wall, not shown, either directly or through a wire, chain or similar suspension means; these eyes are conveniently secured to a spacing block 15 which serves to keep the back of the panel 11 away from the wall so as to let the frame hang exactly vertically. Block 15 may also be used to receive an easel 55, in the form of a wire brace, selectively fitting into holes 56 (FIG. 7) on adjoining sides of the block whereby the frame can be propped upright or sideways against a table top or other supporting surface.

Figure 4:
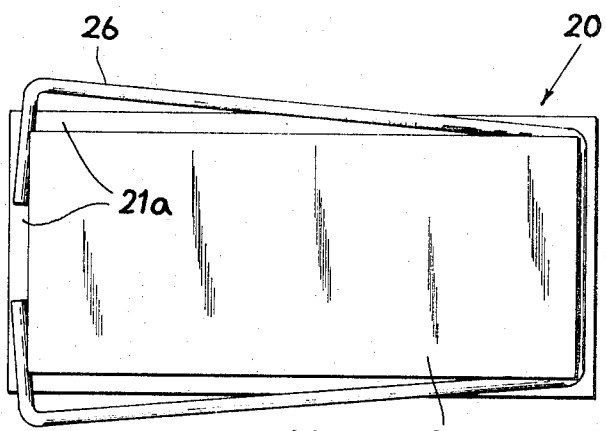
FIG. 4 is a rear view of the package of FIG. 3 in a state of incomplete assembly.
Figure 3:
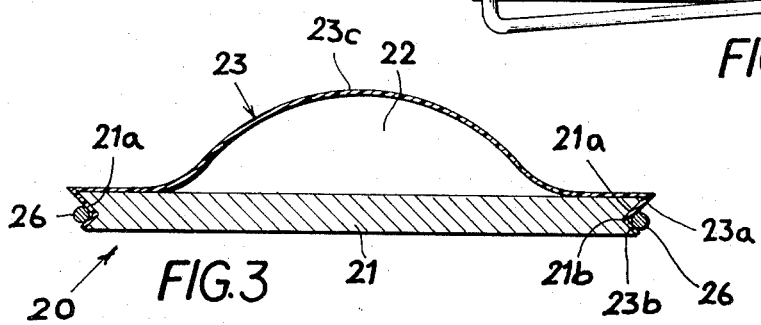
FIG. 3 is a view similar to FIG. 2, showing a cross-section through a display package according to my invention.

In FIGS. 3 and 4 I have shown a display package 20 which is generally similar to the frame 10 of FIGS. 1 and 2, comprising a base board or panel 21 with beveled edges 21a to which a transparent panel 23 may be fastened by means of marginal flaps 23a overlying the edges 21a. The main body of panel 23 has a dome-shaped central portion 23c bulging away from the panel 21 to define therewith a space 22 accommodating any three-dimensional object of suitable size to be visibly packaged.

FIGS. 3 and 4 also illustrate auxiliary restraining means for holding the bent-over peripheral formations 23a in contact with the beveled edges 21a. For this purpose, the edges 21a terminate at a peripheral V-groove 21b while the flaps 23a are formed with divergent extensions 23b defining therewith a similar V-groove to accommodate a peripheral clip 26. This clip, which may be of any suitable profile, is shown in FIG. 3 as a rectangular hoop split at one side so that its legs may be elastically bent away for insertion into or removal from the V-groove. Similar restraining means may, of course, also be provided on the frame 10 of FIGS. 1 and 2.

Figure 5:
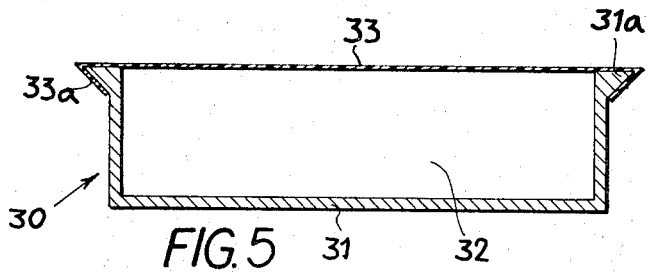
FIG. 5 is a view similar to FIG. 3, showing a modified display package according to my invention.

In FIG. 5 I have shown a somewhat modified display package 30 whose base board 31 has been deepened to form a box framed by a beveled flange 31a; this flange is engaged by flaps 33a of a flat transparent cover 33 similar to panel 13 of FIGS. 1 and 2. The interior 32 of the box may receive three-dimensional articles to be viewed through the cover 33. Auxiliary restraining means, not shown, may again be utilized to hold the peripheral formations 33a in engagement with the edges 31a. It will be apparent that the domed cover 23 and the box-shaped base 31 of FIGS. 3–5 could be made in a series of sizes to accommodate articles of different height.

FIGS. 6–8 show a frame assembly 40 whose back panel consists of two complementary portions 41', 41" provided with peripheral formations 41a' and 41a", respectively. Formations 41a' engage three beveled edges 43a' of a transparent front panel 43, of glass or plastic material, whose fourth beveled edge 43a" is overlain by the edge 41a" upon the assembly of the two back-panel sections 41', 41" into a unit. To insure a proper fit between these sections, section 41' is formed with a trapezoidal cut 41c accommodating the similarly shaped section 41". A hook 48 on panel section 41' co-operates with an eye 49 on panel section 41" to fasten the two sections together; suspension means 44 and a spacer block 45 are provided on section 41' for the purpose described in connection with FIGS. 1 and 2. A picture to be sandwiched between panels 43 and 41', 41" has been shown at 42.

Instead of making the peripheral formations in the form of continuous flaps, as illustrated in the preceding embodiments, they could also be designed as spaced-apart hook-shaped elements. This has been illustrated, by way of example, in FIGS. 9–11 which show a frame assembly 50 with a back panel 51, a transparent front panel 53 and an interposed sheet 52 to be displaced. Panel 51 is provided with three sets of fixed peripheral hooks 51a' and one set of removable peripheral hooks 51a", the latter being positioned along the upper edge of panel 51 for engagement with the corresponding edge of front panel 53. Hooks 51a" are shown formed with bifurcate extremities 51c by which they may be slid into engagement with associated mounting bolts 51d. Panel 51 is also shown provided with beveled edges 53e, sloping in the opposite direction with reference to edges 53a of panel 53, the hooks 51a', 51a" being doubly bent to fit the mitered shape of the two adjacent panels.

With the forwardly facing beaks of hooks 51a', 51a" overlying only the beveled peripheral zone of panel 53, the flat front surface of the latter is completely unobstructed so as to give a full view of the underlying picture 52. The same is true of the edge flaps 41a', 41a" in FIGS. 6–8 which also engage only the beveled periphery of panel 43. In the display mounts of FIGS. 1–5, the beveled edges are averted from the observer so that only the surface to be exhibited is visible there.

It will be apparent that the continuous flaps 13a, 23a, 33a of FIGS. 1–5 could also be subdivided into spaced-apart lugs, similar to the hooks of FIGS. 9–11, if the requirements for structural rigidity of the assembly are less severe. This and other modifications, readily apparent to persons skilled in the art, are intended to be embraced within the spirit and scope of my invention as defined in the appended claims.

I claim:

1. A display mount for an object to be exhibited, comprising a first panel and a transparent second panel of substantially identical outline adapted to receive said object therebetween, one of said panels being provided with at least one pair of beveled edges facing away from the other panel and including obtuse angles with an exposed face of said one panel, and bent-over peripheral formations on said other panel overhanging the periphery of said one panel and engaging said beveled edges for holding said panels together with said object sandwiched therebetween, said peripheral formations terminating at said beveled edges without overhanging said exposed face.

2. A display mount as defined in claim 1 wherein said panels are rectangular.

3. A display mount as defined in claim 2 wherein said first panel is provided with said beveled edges on four sides, said second panel consisting of pliable sheet material, said peripheral formations consisting of four marginal edge portions integral with said second panel.

4. A display mount as defined in claim 3, further comprising retaining means for holding said edge portions in contact with said beveled edges.

5. A display mount as defined in claim 2 wherein said second panel is a rigid plate provided with said beveled edges on four sides, at least one of said peripheral formations being separable from said first panel.

6. A display mount as defined in claim 5 wherein said first panel comprises two complementary portions, one of said portions carrying peripheral formations engageable with three sides of said second panel, the other portion carrying a peripheral formation engageable with the fourth side of said second panel.

7. A display mount as defined in claim 6 wherein said first panel is further provided with fastening means for locking said portions to each other in a position of engagement between said peripheral formations and said second panel.

8. A display mount as defined in claim 5 wherein said peripheral formations includes three sets of fixed hook-shaped elements on three sides of said first panel and a fourth group of removable hook-shaped elements on the fourth side thereof.

9. A display mount as defined in claim 1 wherein said first panel is provided, on its face remote from said second panel, with suspension means for hanging the mount from a wall and with spacing means carrying said suspension means for keeping the back of said first panel away from a wall.

10. A display mount as defined in claim 9, further comprising removable bracing means on said spacing means for propping said panels against a supporting surface.

11. A display mount as defined in claim 10 wherein said spacing means comprises a block formed with apertures on adjoining sides, said bracing means being an easel selectively fitting into said apertures on any of said sides.

12. A display mount as defined in claim 1 wherein said second panel has a central portion bent away from said first panel for defining therewith a space accommodating three-dimensional objects.

References Cited

UNITED STATES PATENTS

| D. 208,556 | 9/1967 | Ebner | 29—23 |
| 2,521,558 | 9/1950 | Alvarez | 40—152 |
| 3,416,765 | 12/1968 | Ebner | 40—152.1 |

FOREIGN PATENTS

| 1,390,896 | 1/1965 | France | 40—152 |

JEROME SCHNALL, Primary Examiner

W. J. CONTRERAS, Assistant Examiner

U.S. Cl. X.R.

40—10